(12) United States Patent
Choi et al.

(10) Patent No.: US 12,183,114 B2
(45) Date of Patent: Dec. 31, 2024

(54) DISPLAY DEVICE

(71) Applicant: Samsung Display Co., Ltd., Yongin-Si (KR)

(72) Inventors: Kyung Min Choi, Seoul (KR); Ji Hun Ryu, Hwaseong-si (KR); Su Yul Seo, Incheon (KR); Kwang Hyun Baek, Asan-si (KR); Dong Hwan Lee, Yongin-si (KR); Won Ki Hong, Suwon-si (KR); Jeong An Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 17/869,661

(22) Filed: Jul. 20, 2022

(65) Prior Publication Data

US 2023/0100439 A1 Mar. 30, 2023

(30) Foreign Application Priority Data

Sep. 28, 2021 (KR) ........................ 10-2021-0127869

(51) Int. Cl.
*G06V 40/13* (2022.01)
*G06F 3/042* (2006.01)
*G06V 10/147* (2022.01)
*G06V 40/12* (2022.01)

(52) U.S. Cl.
CPC ........ *G06V 40/1306* (2022.01); *G06F 3/0421* (2013.01); *G06V 10/147* (2022.01); *G06V 40/1329* (2022.01); *G06V 40/1359* (2022.01)

(58) Field of Classification Search
CPC ............. G06V 40/1306; G06V 10/147; G06V 40/1329; G06V 40/1359; G06V 40/1318; G06F 3/0421; G06F 1/1656; G06F 1/1684; H04M 1/0266
See application file for complete search history.

(56) References Cited

U.S. PATENT DOCUMENTS

| | | | |
|---|---|---|---|
| 2014/0354596 A1 | 12/2014 | Djordjev et al. | |
| 2018/0299929 A1* | 10/2018 | Kim | ...................... G06F 1/1635 |
| 2019/0311172 A1* | 10/2019 | Kang | .................... G06F 1/3278 |
| 2023/0185390 A1* | 6/2023 | Seo | ....................... G06F 3/0412 |
| | | | 345/174 |

FOREIGN PATENT DOCUMENTS

| | | |
|---|---|---|
| JP | 2017-001940 A | 1/2017 |
| KR | 2019-0062143 A | 6/2019 |
| KR | 2021-0005412 A | 1/2021 |

* cited by examiner

*Primary Examiner* — Abhishek Sarma
(74) *Attorney, Agent, or Firm* — Innovation Counsel LLP

(57) ABSTRACT

Provided is a display device comprising a display panel, a metal plate on a bottom surface of the display panel, the metal plate including a first surface facing the bottom surface of the display panel and a second surface opposite to the one surface, and a fingerprint sensor overlappingly disposed on the second surface of the metal plate, wherein the metal plate includes an indentation groove recessed in a direction toward the first surface from the second surface of the metal plate, and the fingerprint sensor is disposed on the second surface of the metal plate on which the indentation groove is formed.

16 Claims, 13 Drawing Sheets

DISPLAY DEVICE

CROSS-REFERENCE TO RELATED APPLICATION

This application claims priority from Korean Patent Application No. 10-2021-0127869 filed on Sep. 28, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure generally relates to a display device. More particularly, the represent disclosure relates to a display device capable of reducing defective visual recognition of a region of a metal plate to which a fingerprint sensor is attached.

2. Description of the Related Art

A display device is applied to various electronic devices such as a smartphone, a tablet, a notebook computer, a monitor, and a television (TV). With the recent advance of mobile communication technology, the use of portable electronic devices such as a smartphone, a tablet, and a notebook computer has increased enormously. Privacy information is stored in the portable electronic device. Accordingly, in order to protect the privacy information of the portable electronic device, it has been typical to use fingerprint authentication in which a fingerprint as user's biometric information is used for authentication. To this end, the display device may include a fingerprint sensor for fingerprint authentication.

The fingerprint sensor may be implemented as an optical sensor, an ultrasonic sensor, a capacitive sensor, or the like. The fingerprint sensor is disposed under a display panel of the display device, and several members may be disposed between the display panel and the fingerprint sensor. An incident signal transmitted from the fingerprint sensor is reflected from the user's fingerprint and received back in the form of a reflected signal by the fingerprint sensor.

SUMMARY

Aspects of the present disclosure provide a display device capable of reducing defective visual recognition of a region of a metal plate to which a fingerprint sensor is attached.

However, aspects of the present disclosure are not restricted to the oneset forth herein. The above and other aspects of the present disclosure will become more apparent to one of ordinary skill in the art to which the present disclosure pertains by referencing the detailed description of the present disclosure given below.

According to an embodiment, a display device comprises a display panel; a metal plate disposed on a bottom surface of the display panel, the metal plate including a first surface facing the bottom surface of the display panel and a second surface opposite to the first surface; and a fingerprint sensor overlappingly disposed on the second surface of the metal plate, wherein the metal plate includes an indentation groove recessed in a direction toward the first surface from the second surface of the metal plate, and the fingerprint sensor is disposed on the second surface of the metal plate on which the indentation groove is formed.

According to another embodiment, a display device comprises a display panel; a metal plate disposed on a bottom surface of the display panel; and a fingerprint sensor disposed on the metal plate, wherein the metal plate includes: a first metal plate part disposed on a lower portion of the display panel; and a second metal plate part disposed on a lower portion of the first metal plate part, wherein a through hole exposing one surface of the first metal plate part is formed in the second metal plate part, and the fingerprint sensor is disposed on one surface of the first metal plate part in the through hole.

According to still another embodiment, a display device comprises a display panel; a metal plate disposed on a bottom surface of the display panel, the metal plate including a first surface facing the bottom surface of the display panel and a second surface opposite to the first surface; and a fingerprint sensor overlappingly disposed on the second surface of the metal plate, wherein the metal plate includes: a first indentation groove recessed in a direction toward the first surface from the second surface of the metal plate; and a plurality of second indentation grooves further recessed in a direction toward the one surface from the other surface of the metal plate on which the first indentation groove is formed, wherein the plurality of second indentation grooves overlap the first indentation groove, and the fingerprint sensor is disposed in the first indentation groove and overlaps the plurality of second indentation grooves.

In accordance with the display device including the fingerprint sensor according to embodiments, it is possible to reduce defective visual recognition of the region of the metal plate to which the fingerprint sensor is attached.

However, the effects of the present disclosure are not limited to the aforementioned effects, and various other effects are included in the present specification.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

Figure 1:
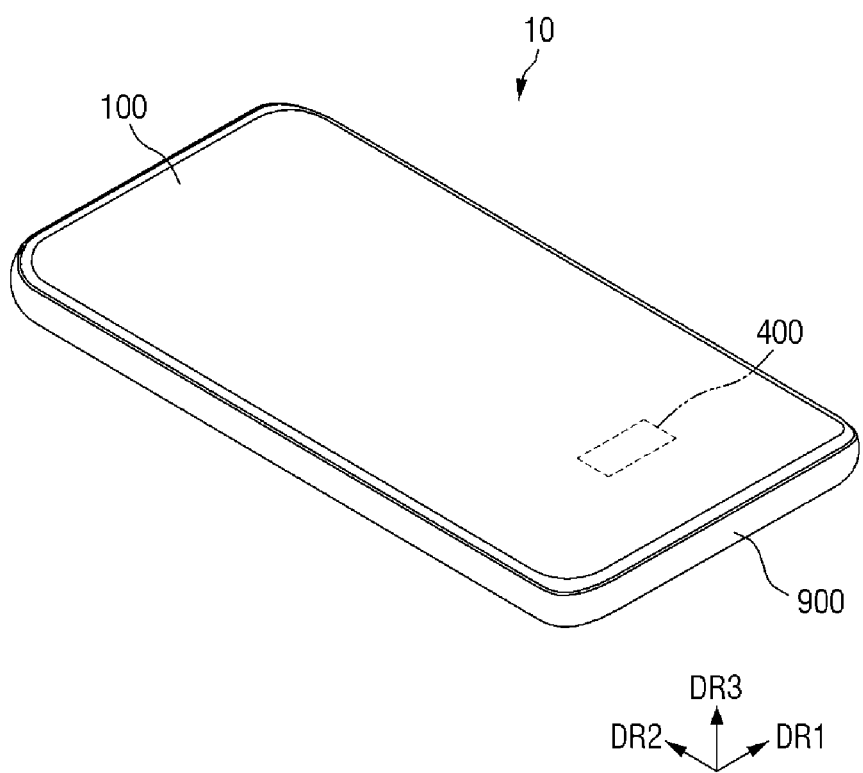
FIG. 1 is a perspective view illustrating a display device according to one embodiment.

Specific structural and functional descriptions of embodiments of the disclosure disclosed herein are only for illustrative purposes of the embodiments of the disclosure. The disclosure may be embodied in many different forms without departing from the spirit and significant characteristics of the disclosure. Therefore, the embodiments of the disclosure are disclosed only for illustrative purposes and should not be construed as limiting the disclosure. That is, the disclosure is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The example term "lower," can therefore, encompass both an orientation of "lower" and "upper," depending on the particular orientation of the figure. Similarly, if the device in one of the figures is turned over, elements described as "below" or "beneath" other elements would then be oriented "above" the other elements. The example terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the attached drawings.

Figure 2:
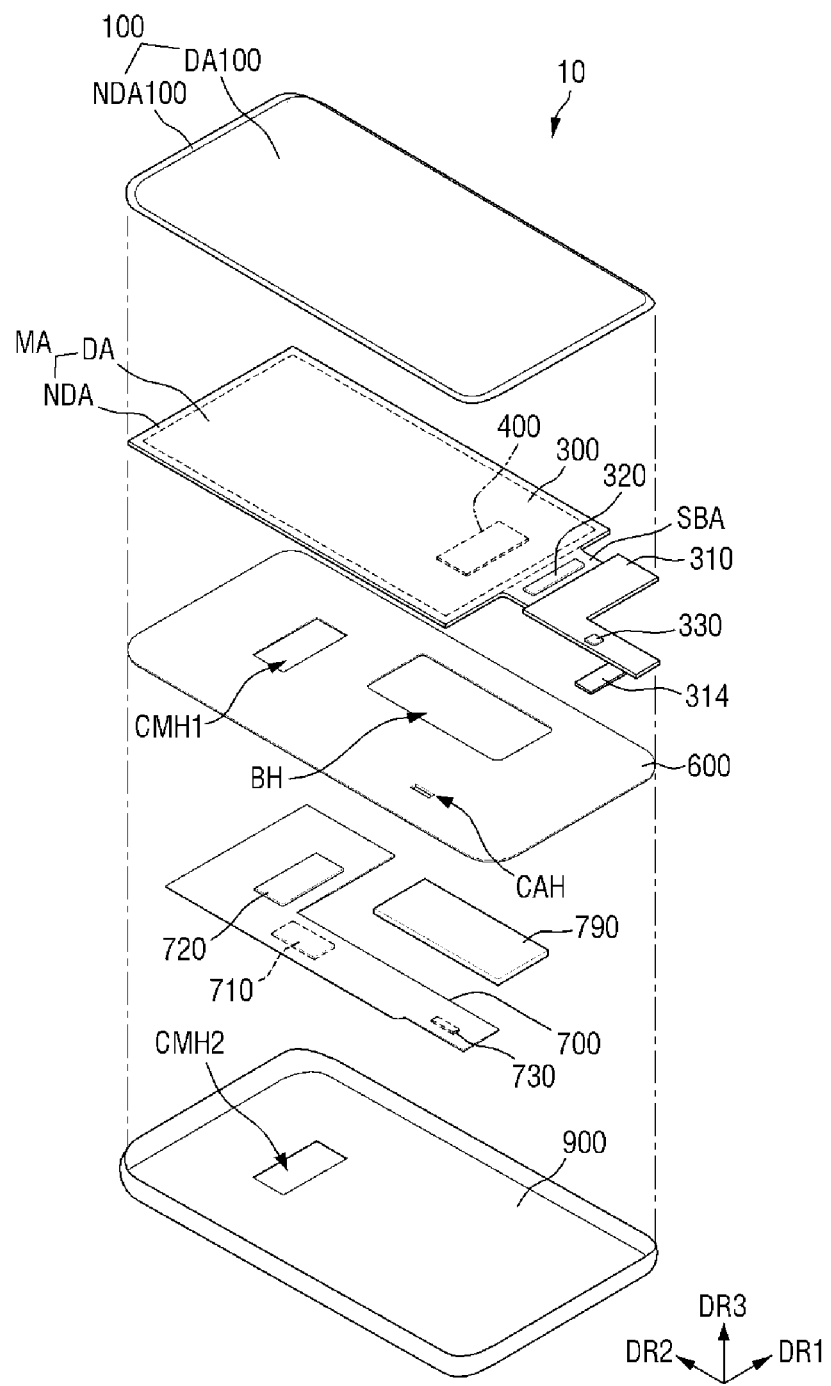
FIG. 2 is an exploded perspective view showing a display device according to one embodiment.

FIG. 1 is a perspective view illustrating a display device according to one embodiment. FIG. 2 is an exploded perspective view showing a display device according to one embodiment.

Referring to FIGS. 1 and 2, a display device 10 according to one embodiment may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. Alternatively, the display device 10 according to one embodiment may be applied as a display unit of a television, a laptop, a monitor, a billboard, or an Internet-of-Things (IoT) terminal. Alternatively, the display device 10 according to one embodiment may be applied to wearable devices such as a smart watch, a watch phone, a glasses type display, or a head mounted display (HMD). Alternatively, the display device 10 according to one embodiment may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

In the present disclosure, a first direction DR1 may be a short side direction of the display device 10, for example, a horizontal direction of the display device 10. A second direction DR2 may be a long side direction of the display device 10, for example, a vertical direction of the display device 10. A third direction DR3 may be a thickness direction of the display device 10.

The display device 10 may have a planar shape similar to a quadrilateral shape. For example, the display device 10 may have a planar shape similar to a rectangular shape having short sides in the first direction DR1 and long sides in the second direction DR2, as shown in FIG. 1. A corner where the short side in the first direction DR1 and the long side in the second direction DR2 meet may be right-angled or rounded with a predetermined curvature. The planar shape of the display device 10 is not limited to a quadrilateral shape, and may be formed in a shape similar to another polygonal shape, a circular shape, or elliptical shape.

The display device 10 may have a flat surface. Alternatively, the display device 10 may be formed such that two sides facing each other are bendable. For example, the display device 10 may be formed such that the left and right sides are bendable. Alternatively, the display device 10 may be formed such that all of the upper, lower, left, and right sides are bendable.

The display device 10 according to one embodiment includes a cover window 100, a display panel 300, a display circuit board 310, a display driving circuit 320, a fingerprint sensor 400, a bracket 600, a main circuit board 700, and a lower cover 900.

The cover window 100 may be disposed above the display panel 300 to cover the front surface of the display panel 300. Accordingly, the cover window 100 may function to protect the top surface of the display panel 300.

The cover window 100 may include a light transmitting portion DA100 corresponding to the display panel 300 and a light blocking portion NDA100 corresponding to an area other than the display panel 300 and surrounding the light transmitting portion DA100. The light blocking portion NDA100 may be formed to be opaque. Alternatively, the light blocking portion NDA100 may be formed as a decorative layer having a pattern that can be displayed to a user when an image is not displayed.

The display panel 300 may be disposed below the cover window 100. The display panel 300 may be a light emitting display panel including a light emitting element. For example, the display panel 300 may be an organic light emitting display panel using an organic light emitting diode including an organic light emitting layer.

The display panel 300 may include a main region MA and a sub-region SBA.

The main region MA may include a display area DA displaying an image and a non-display area NDA that is a peripheral area of the display area DA. The display area DA may include display pixels ('SP' in FIG. 3) for displaying an image. The non-display area NDA may be defined as an area from the boundary of the display area DA to the edge of the display panel 300.

The display area DA may include a fingerprint sensing area. The fingerprint sensing area indicates an area where the fingerprint sensor 400 is disposed. The fingerprint sensing area may be a partial area of the display area DA as shown in FIG. 2. The fingerprint sensor 400 may include, for example, an optical fingerprint sensor, an ultrasonic fingerprint sensor, or a capacitive fingerprint sensor. The following description is directed to the case where an ultrasonic fingerprint sensor is applied as the fingerprint sensor 400.

The planar shape of the main region MA of the display panel 300 may be a rectangular shape. For example, the planar shape of the main region MA may have a rectangular shape with right-angled corners. However, the present disclosure is not limited thereto, and the planar shape of the main region MA may be a rectangular shape having rounded corners.

The sub-region SBA may protrude from one side of the main region MA in the second direction DR2. The length of the sub-region SBA in the first direction DR1 may be smaller than the length of the main region MA in the first direction DR1, and the length of the sub-region SBA in the second direction DR2 may be smaller than the length of the main region MA in the second direction DR2, but the present disclosure is not limited thereto.

Although it is shown in FIG. 2 that the sub-region SBA is unfolded, the sub-region SBA may be bent and, in this case, arranged on the bottom surface of the display panel 300. In the case where the sub-region SBA is bent, it may overlap the main region MA in the thickness direction DR3 of the substrate SUB. The display circuit board 310 and the display driving circuit 320 may be disposed in the sub-region SBA.

The display circuit board 310 may be attached to one end of the sub-region SBA of the display panel 300 with a conductive adhesive member such as an anisotropic conductive film. As a consequence, the display circuit board 310 may be electrically connected to the display panel 300 and the display driving circuit 320. The display panel 300 and the display driving circuit 320 may receive digital video data, timing signals, and driving voltages via the display circuit board 310. The display circuit board 310 may be a flexible printed circuit board, a printed circuit board, or a flexible film such as a chip on film.

The display driving circuit 320 may generate signals and voltages for driving the display panel 300. The display driving circuit 320 may be formed as an integrated circuit (IC) and attached to the sub-region SBA of the display panel 300 by a chip on glass (COG) method, a chip on plastic (COP) method, or an ultrasonic bonding method, but the present disclosure is not limited thereto. For example, the display driving circuit 320 may be attached to the display circuit board 310 by a chip on film (COF) method.

A touch driving circuit 330 may be disposed on the display circuit board 310. The touch driving circuit 330 may be formed as an integrated circuit and attached to the top surface of the display circuit board 310.

Further, a power supply unit may be additionally disposed on the display circuit board 310 to supply display driving voltages for driving the display driving circuit 320.

The fingerprint sensor 400 may be disposed on the bottom surface of the display panel 300. The fingerprint sensor 400 may be attached to the bottom surface of the display panel 300 using a fifth bonding member to be described later.

The bracket 600 may be disposed under the display panel 300. The bracket 600 may include plastic, metal, or both plastic and metal. A first camera hole CMH1 into which a first camera sensor 720 is inserted, a battery hole BH in which a battery is disposed, and a cable hole CAH through which a cable 314 connected to the display circuit board 310 passes may be formed in the bracket 600.

The main circuit board 700 and a battery 790 may be disposed under the bracket 600. The main circuit board 700 may be a printed circuit board or a flexible printed circuit board.

The main circuit board 700 may include a main processor 710, a first camera sensor 720, and a main connector 730. The first camera sensor 720 may be disposed on both the top and bottom surfaces of the main circuit board 700, the main processor 710 may be disposed on the top surface of the main circuit board 700, and the main connector 730 may be disposed on the bottom surface of the main circuit board 700.

The main processor 710 may control all functions of the display device 10. For example, the main processor 710 may output digital video data to the display driving circuit 320 through the display circuit board 310 such that the display panel 300 displays an image. Further, the main processor 710 may receive touch data from the touch driving circuit 330 and determine a user's touch coordinates, and then execute an application indicated by an icon displayed on the user's touch coordinates. Furthermore, the main processor 710 may convert first image data inputted from the first camera sensor 720 into digital video data and output it to the display driving circuit 320 through the display circuit board 310, thereby displaying an image captured by the first camera sensor 720 on the display panel 300.

The first camera sensor 720 may process an image frame of a still image or video obtained by the image sensor and output it to the main processor 710. The first camera sensor 720 may be a complementary metal-oxide-semiconductor (CMOS) image sensor or a charge-coupled device (CCD) sensor. The first camera sensor 720 may be exposed to the bottom surface of the lower cover 900 by a second camera hole CMH2 to thereby capture an image of a background or an object disposed below the display device 10.

The cable 314 having passed through the cable hole CAH of the bracket 600 may be connected to the main connector 730 of the main circuit board 700. Thus, the main circuit board 700 may be electrically connected to the display circuit board 310.

The battery 790 may be disposed so as not to overlap the main circuit board 700 in the third direction DR3. The battery 790 may overlap the battery hole BH of the bracket 600. In addition, the fingerprint sensor 400 may also overlap the battery hole BH of the bracket 600.

In addition, the main circuit board 700 may be further equipped with a mobile communication module capable of transmitting and receiving radio signals with at least one of a base station, an external terminal, and a server in a mobile communication network. The radio signal may include various types of data according to transmission and reception of a voice signal, a video call signal, or a text/multimedia message.

The lower cover 900 may be disposed below the main circuit board 700 and the battery 790. The lower cover 900 may be fixed by being fastened to the bracket 600. The lower cover 900 may form an external appearance of the bottom surface of the display device 10. The lower cover 900 may include plastic, metal, or both plastic and metal.

The second camera hole CMH2 exposing the bottom surface of the first camera sensor 720 may be formed in the lower cover 900. The position of the first camera sensor 720 and the positions of the first and second camera holes CMH1 and CMH2 corresponding to the first camera sensor 720 are not limited to the embodiment illustrated in FIG. 2.

Figure 3:
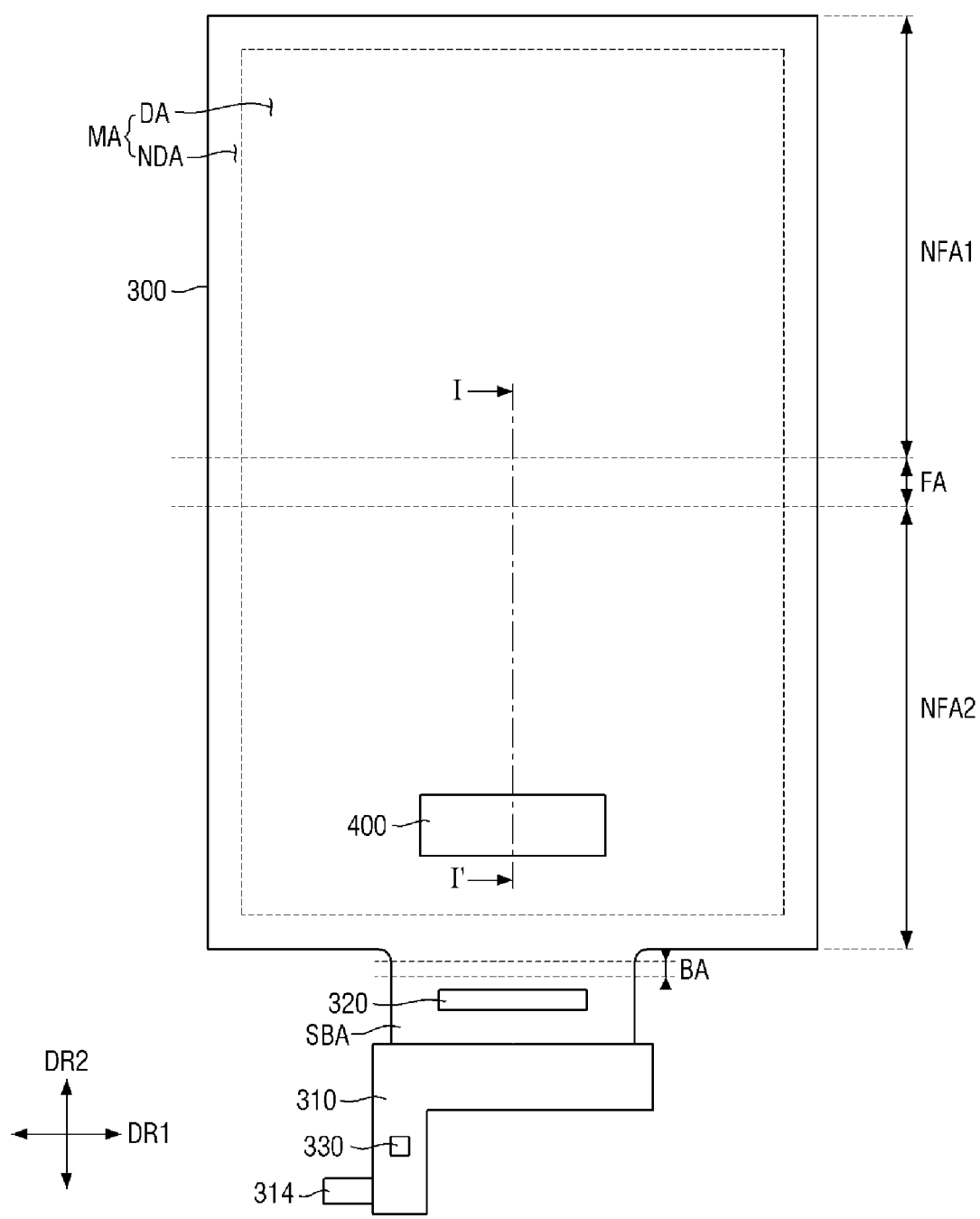
FIG. 3 is a plan view illustrating a display panel, a display circuit board, and a display driving circuit of FIG. 2.

FIG. 3 is a plan view illustrating a display panel, a display circuit board, and a display driving circuit of FIG. 2.

Referring to FIG. 3, a folding area FA and non-folding areas NFA1 and NFA2 may be further defined in the display device. The folding area FA may have a rectangular shape extending along the first direction DR1. The first non-folding area NFA1 may be located on one side of the folding area FA in the second direction DR2, and the second non-folding area NFA2 may be located on the other side of the folding area FA in the second direction DR2. The area of each of the non-folding areas NFA1 and NFA2 may be larger than the area of the folding area FA, but is not limited thereto. That is, the area of the folding area FA is equal to or larger than the area of the non-folding areas NFA1 and MFA2.

The display device may be a foldable display device that can be folded and unfolded with respect to the folding area FA in a state where the non-folding areas NFA1 and NFA2 are unfolded. The display device is an in-foldable display device which is in-folded such that the top surface of the first non-folding area NFA1 of the display device and the top surface of the second non-folding area NFA2 of the display device face each other with respect to the folding area FA, or an out-foldable display device which is out-folded such that the bottom surface of the first non-folding area NFA1 of the display device and the bottom surface of the second non-folding area NFA2 of the display device face each other with respect to the folding area FA.

The fingerprint sensor 400 may be disposed in the second non-folding area NFA2, as illustrated in FIG. 3. However, the present disclosure is not limited thereto, and the fingerprint sensor 400 may be disposed in the first non-folding area NFA1 or in the folding area FA. In another embodiment, the fingerprint sensor 400 may be disposed in the first non-folding area NFA1, the second non-folding area NFA2, and the folding area FA simultaneously.

Figure 4:
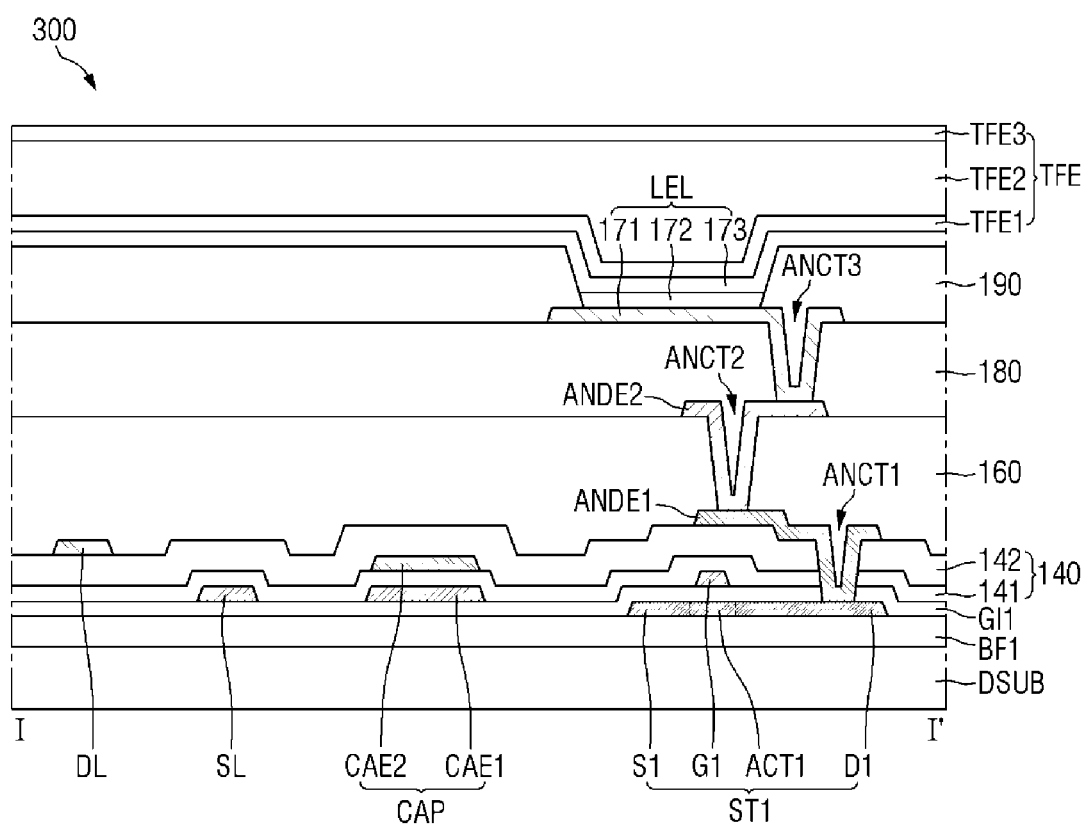
FIG. 4 is an example cross-sectional view of the display panel of FIG. 3.

FIG. 4 is an example cross-sectional view of the display panel of FIG. 3.

Referring to FIG. 4, the display panel 300 may include display pixels for displaying an image. Each of the display pixels SP may include a light emitting element LEL, a first thin film transistor ST1, and a capacitor CAP.

The display substrate DSUB may be made of an insulating material such as glass, or polymer resin. For example, the display substrate DSUB may include polyimide. The display substrate DSUB may be a flexible substrate which can be bent, folded or rolled.

The display substrate DSUB may include, for example, a plurality of organic layers and a plurality of inorganic layers. For example, the display substrate DSUB may include a first organic layer, a first barrier layer disposed on the first organic layer and including at least one inorganic layer, a second organic layer disposed on the first barrier layer, and a second barrier layer disposed on the second organic layer and including at least one inorganic layer.

A first buffer layer BF1 may be disposed on the display substrate DSUB. The first buffer layer BF1 is a layer for protecting thin film transistors of the thin film transistor layer TFTL and a light emitting layer 172 of the light emitting element layer EML from moisture permeating through the display substrate DSUB which is susceptible to moisture permeation. The first buffer layer BF1 may be formed of a plurality of inorganic layers that are alternately stacked. For example, the first buffer layer BF1 may be formed of multiple layers in which one or more inorganic layers of a silicon nitride layer, a silicon oxynitride layer, a silicon oxide layer, a titanium oxide layer and an aluminum oxide layer are alternately stacked.

A first active layer ACT1, a first source electrode S1, and a first drain electrode D1 of the first thin film transistor ST1 may be disposed on the first buffer layer BF1. The first active layer ACT1 of the first thin film transistor ST1 includes polycrystalline silicon, monocrystalline silicon, low-temperature polycrystalline silicon, amorphous silicon, or an oxide semiconductor. The first source electrode S1 and the first drain electrode D1 may have conductivity by doping a silicon semiconductor or an oxide semiconductor with ions or impurities. The first active layer ACT1 may overlap a first gate electrode G1 in the third direction DR3 which is the thickness direction of the display substrate DSUB, and the first source electrode S1 and the first drain electrode D1 may not overlap the first gate electrode G1 in the third direction DR3.

A first gate insulating layer GI1 may be disposed on the first active layer ACT1 of the first thin film transistor ST1. The first gate insulating layer GI1 may be formed of an inorganic layer, for example, a silicon nitride layer, a silicon oxynitride layer, a silicon oxide layer, a titanium oxide layer, or an aluminum oxide layer.

A scan line SL, a first capacitor electrode CAE1, and a first gate electrode G1 of the first thin film transistor ST1 may be disposed on the first gate insulating layer GI1. The first gate electrode G1 may overlap the first active layer ACT1 in the third direction DR3. The scan line SL may be electrically connected to the first gate electrode G1. The first capacitor electrode CAE1 may overlap a second capacitor electrode CAE2 in the third direction DR3. The first gate electrode G1 and the scan line SL may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A first interlayer insulating layer 141 may be disposed on the first gate electrode G1 and the first capacitor electrode CAE1. The first interlayer insulating layer 141 may be formed of an inorganic layer, for example, a silicon nitride layer, a silicon oxynitride layer, a silicon oxide layer, a titanium oxide layer, or an aluminum oxide layer.

The second capacitor electrode CAE2 may be disposed on the first interlayer insulating layer 141. Because the first interlayer insulating layer 141 has a predetermined dielectric constant, a capacitor CAP may be formed by the first and second capacitor electrodes CAE1 and CAE2 and the first interlayer insulating layer 141 disposed between the first and second capacitor electrodes CAE1 and CAE2. The second capacitor electrode CAE2 may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

A second interlayer insulating layer 142 may be disposed on the second capacitor electrode CAE2. The second interlayer insulating layer 142 may be formed of an inorganic layer, for example, a silicon nitride layer, a silicon oxynitride layer, a silicon oxide layer, a titanium oxide layer, or an aluminum oxide layer. The second interlayer insulating layer 142 may include a plurality of inorganic layers.

A first pixel connection electrode ANDE1 and a data line DL may be disposed on the second interlayer insulating layer 142. The first pixel connection electrode ANDE1 may penetrate the first interlayer insulating layer 141 and the second interlayer insulating layer 142 to be connected to the first drain electrode D1 of the first thin film transistor ST1 via a first pixel contact hole ANCT1 that exposes the first drain electrode D1 of the first thin film transistor ST1. The first pixel connection electrode ANDE1 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A first organic layer 160 for planarization may be disposed on the first pixel connection electrode ANDE1. The first organic layer 160 may be formed of acryl resin, epoxy resin, phenolic resin, polyamide resin, polyimide resin, or the like.

A second pixel connection electrode ANDE2 may be disposed on the first organic layer 160. The second pixel connection electrode ANDE2 may be connected to the first pixel connection electrode ANDE1 via a second pixel contact hole ANCT2 penetrating the first organic layer 160 to expose the first pixel connection electrode ANDE1. The second pixel connection electrode ANDE2 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof. A second organic layer 180 may be disposed on the second pixel connection electrode ANDE2. The second organic layer 180 may be formed of acryl resin, epoxy resin, phenolic resin, polyamide resin, polyimide resin, or the like.

Meanwhile, in one embodiment, the second pixel connection electrode ANDE2 and the second organic layer 180 may be omitted. In this case, the first pixel connection electrode ANDE1 may be directly connected to a light emitting pixel electrode 171.

Although FIG. 4 illustrates that the first thin film transistor ST1 is configured to be of a top gate type in which the first gate electrode G1 is located on top of the first active layer ACT1, it is noted that the present disclosure is not limited thereto. The first thin film transistor ST1 may be configured to be of a bottom gate type in which the first gate electrode G1 is located under the first active layer ACT1, or a double gate type in which the first gate electrode G1 is located on and under the first active layer ACT1.

The light emitting elements LEL and a bank 190 may be disposed on the second organic layer 180. Each of the light emitting elements LEL includes a light emitting pixel electrode 171, a light emitting layer 172, and a light emitting common electrode 173.

The light emitting pixel electrode 171 may be formed on the second organic layer 180. The light emitting pixel electrode 171 may be connected to the second pixel connection electrode ANDE2 via a third pixel contact hole ANCT3 penetrating the second organic layer 180 to expose the second pixel connection electrode ANDE2.

In a top emission structure in which light is emitted toward the light emitting common electrode 173 when viewed with respect to the light emitting layer 172, the light emitting pixel electrode 171 may be formed of a metal material having high reflectivity such as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO. The APC alloy is an alloy of silver (Ag), palladium (Pd) and copper (Cu).

The bank 190 may be formed to delimit the light emitting pixel electrode 171 on the second organic layer 180 in order to define an emission area EA. The bank 190 may be formed to cover the edge of the light emitting pixel electrode 171. The bank 190 may be formed of an organic layer such as acryl resin, epoxy resin, phenolic resin, polyamide resin, polyimide resin and the like.

The emission area EA is an area in which the light emitting pixel electrode 171, the light emitting layer 172, and the light emitting common electrode 173 are sequentially stacked such that the holes from the light emitting pixel electrode 171 and the electrons from the light emitting common electrode 173 are combined with each other to emit light.

The light emitting layer 172 is formed on the light emitting pixel electrode 171 and the bank 190. The light emitting layer 172 may include an organic material to emit light in a predetermined color. For example, the light emitting layer 172 includes a hole transporting layer, an organic material layer, and an electron transporting layer.

The light emitting common electrode 173 is formed on the light emitting layer 172. The light emitting common electrode 173 may be formed to cover the light emitting layer 172. The light emitting common electrode 173 may be a common layer formed in common on all emission areas EA. A capping layer may be formed on the light emitting common electrode 173.

In the top emission structure, the light emitting common electrode 173 may be formed of transparent conductive oxide (TCO) such as indium tin oxide (ITO) and indium zinc oxide (IZO) capable of transmitting light or a semi-transmissive conductive material such as magnesium (Mg), silver (Ag), or an alloy of magnesium (Mg) and silver (Ag).

An encapsulation layer TFE may be disposed on the light emitting common electrode 173. The encapsulation layer TFE includes at least one inorganic layer to prevent oxygen or moisture from permeating into the light emitting element layer EML. In addition, the encapsulation layer TFE includes at least one organic layer to protect the light emitting element layer EML from foreign substances such as dust. For example, the encapsulation layer TFE includes a first encapsulation inorganic layer TFE1, an encapsulation organic layer TFE2, and a second encapsulation inorganic layer TFE3.

In one embodiment, the display panel 300 is illustrated as being an organic light emitting display panel using an organic light emitting diode, but the display panel 300 is not limited thereto, and the display panel 300 may be a micro light emitting diode display panel using a micro LED, a quantum dot light emitting display panel using a quantum dot light emitting diode including a quantum dot light emitting layer, or an inorganic light emitting display panel using an inorganic light emitting element including an inorganic semiconductor.

Figure 5:
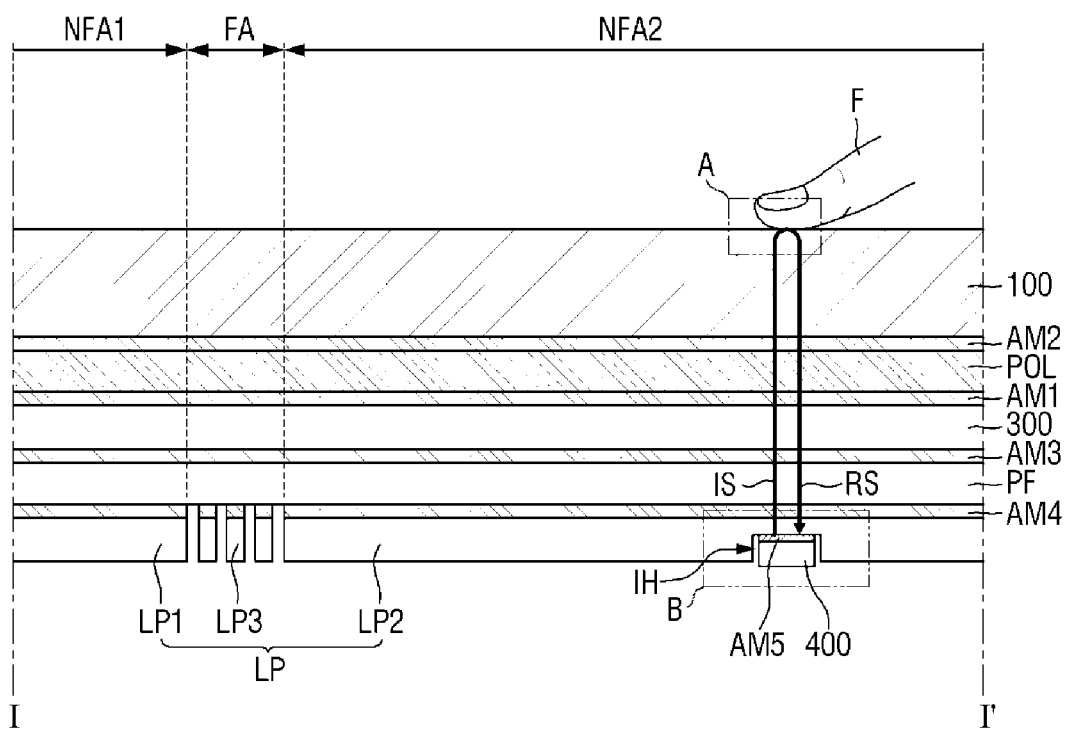
FIG. 5 is a cross-sectional view taken along line I-I' of FIG. 3.
Figure 6:
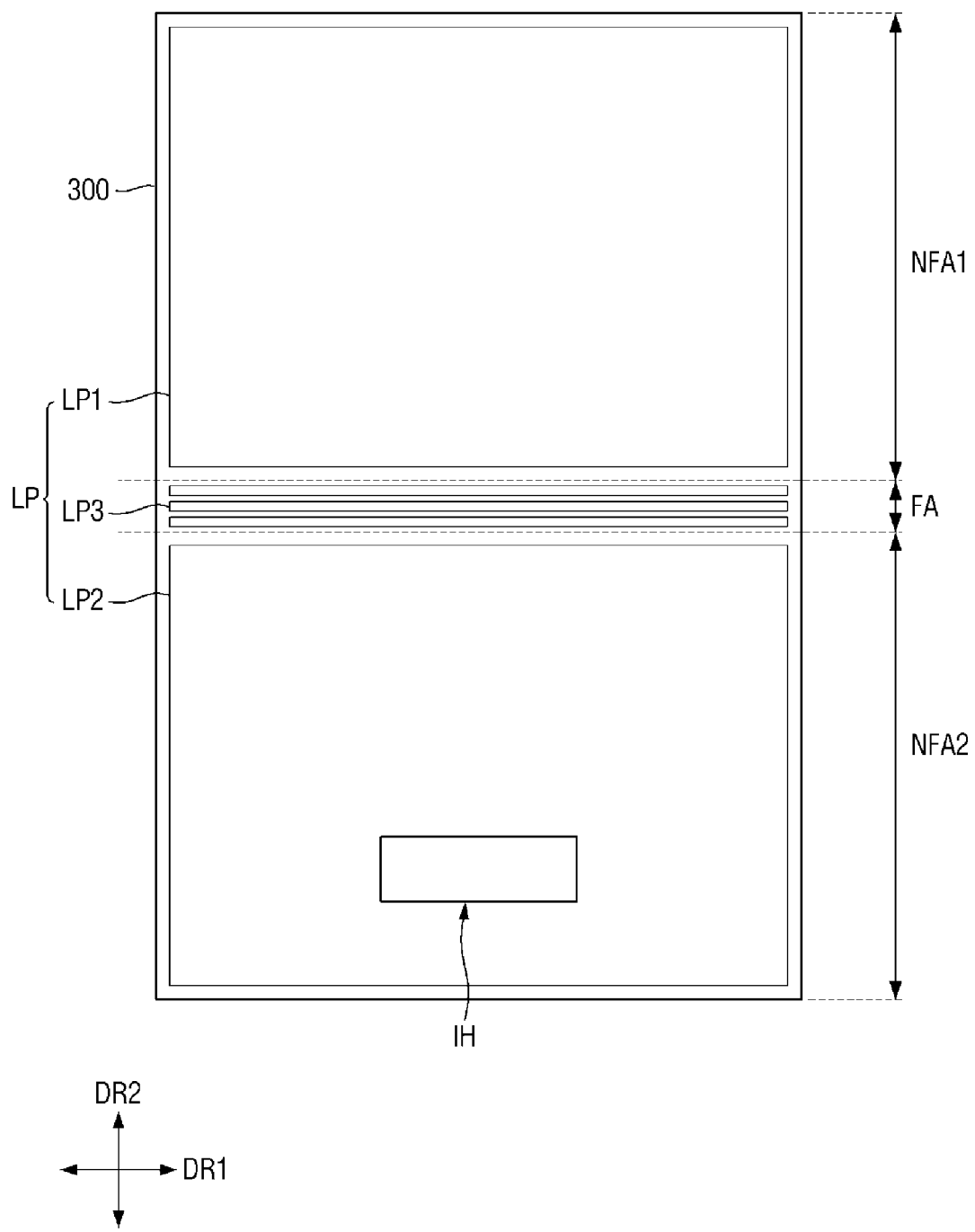
FIG. 6 is a plan view illustrating a metal plate according to one embodiment.

FIG. 5 is a cross-sectional view taken along line I-I' of FIG. 3. FIG. 6 is a plan view illustrating a metal plate according to one embodiment. FIG. 5 illustrates that a user touches the top surface of the cover window 100 with a finger F for fingerprint recognition.

Referring to FIG. 5, the display device may include a polarization layer POL, the cover window 100, a metal plate LP, and bonding members AM1, AM2, AM3, AM4, and AM5 that bond adjacent members. Among the bonding members AM1, AM2, AM3, AM4, and AM5, the first to fourth bonding members AM1, AM2, AM3, and AM4 may be a pressure sensitive adhesive (PSA), and the fifth bonding member AM5 may be a transparent adhesive resin such as an optically clear resin (OCR). However, the present disclosure is not limited thereto, and the first to fourth bonding members AM1, AM2, AM3, and AM4 may be an optically clear resin (OCR) or optically clear adhesive (OCA), and the fifth bonding member AM5 may be a pressure sensitive adhesive (PSA), an optically clear adhesive (OCA), or a colored adhesive resin.

The polarization layer POL may be disposed on the display panel 300. The polarization layer POL may be adhered to the top surface of the display panel 300 through the first bonding member AM1. The polarization layer POL serves to reduce reflection of external light incident through the cover window 100.

The cover window 100 may be disposed on the top surface of the polarization layer POL. The cover window 100 may be adhered to the top surface of the polarization layer POL through the second bonding member AM2 disposed therebetween. In some embodiments, the polarization layer POL may be omitted. In some embodiments where the polarization layer POL is omitted, color filters may be disposed between the cover window 100 and the display panel 300, and a black matrix may be disposed between adjacent color filters.

A protective layer PF may be disposed on the bottom surface of the display panel 300. The protective layer PF may include polyimide (PI), polyethylene terephthalate (PET), or the like, but is not limited to the exemplified materials. The protective layer PF may be adhered to the bottom surface of the display panel 300 through the third bonding member AM3.

When the display panel 300 according to one embodiment is a top emission type display panel, the light transmittance of the third bonding member AM3 may be lower than the light transmittance of the first and second bonding members AM1 and AM2 described above, but the present disclosure is not limited thereto.

The metal plate LP may be disposed under the protective layer PF. The metal plate LP may be adhered to the bottom surface of the protective layer PF through the fourth bonding member AM4. As shown in FIG. 6, the metal plate LP may include a first metal plate LP1 disposed in the first non-folding area NFA1, a second metal plate LP2 disposed in the second non-folding area NFA2, and a third metal plate LP3 formed of a plurality of patterns disposed in the folding area FA. The first and second metal plates LP1 and LP2 serve to support the display panel 300 thereabove in the non-folding areas NFA1 and NFA2, respectively. Each of the first and second metal plates LP1 and LP2 may have a whole pattern shape. The metal plate LP may be made of a metal or a metal alloy. For example, the metal plate LP may be made of an aluminum alloy (SUS), but the material is not limited thereto. In some embodiments, the third metal plate LP3 may be omitted. In the drawing, the first to third metal plates LP1, LP2, and LP3 are shown as being spaced apart from each other, but the present disclosure is not limited thereto, and the first to third metal plates LP1, LP2, and LP3 may be integrally formed and combined with each other.

Meanwhile, an indentation groove IH surrounded by materials forming the second metal plate LP2 may be further defined. The indentation groove IH may be surrounded by materials forming the second metal plate LP2 in plan view. The indentation groove IH may be recessed in a direction from the bottom surface ('LP2a' in FIG. 8) of the second metal plate LP2 toward the top surface (the surface facing the fourth bonding member AM4).

As shown in FIG. 5, the finger F may include a fingerprint facing the cover window 100. The fingerprint of the finger F may include depressions and prominences. The depressions and prominences of the fingerprint may be repeatedly disposed. In at least one section including one depression and one prominence taken among the repeated depressions and prominences, the prominence may be referred to as ridge RID (shown in FIG. 7) and the depression may be referred to as valley VAL (shown in FIG. 7). The ridge RID of the fingerprint may be closer to the cover window 100 than the valley VAL of the fingerprint. An operation method of the ultrasonic fingerprint sensor will be described in detail with reference to FIG. 7.

In some embodiments, separate layers may be further disposed between the metal plate LP and the protective layer PF. The layers include at least one functional layer. The functional layer may be a layer that performs a heat dissipation function, an electromagnetic shielding function, a grounding function, a buffering function, a rigidity enhancing function, a supporting function, and/or a digitizing function.

Figure 7:
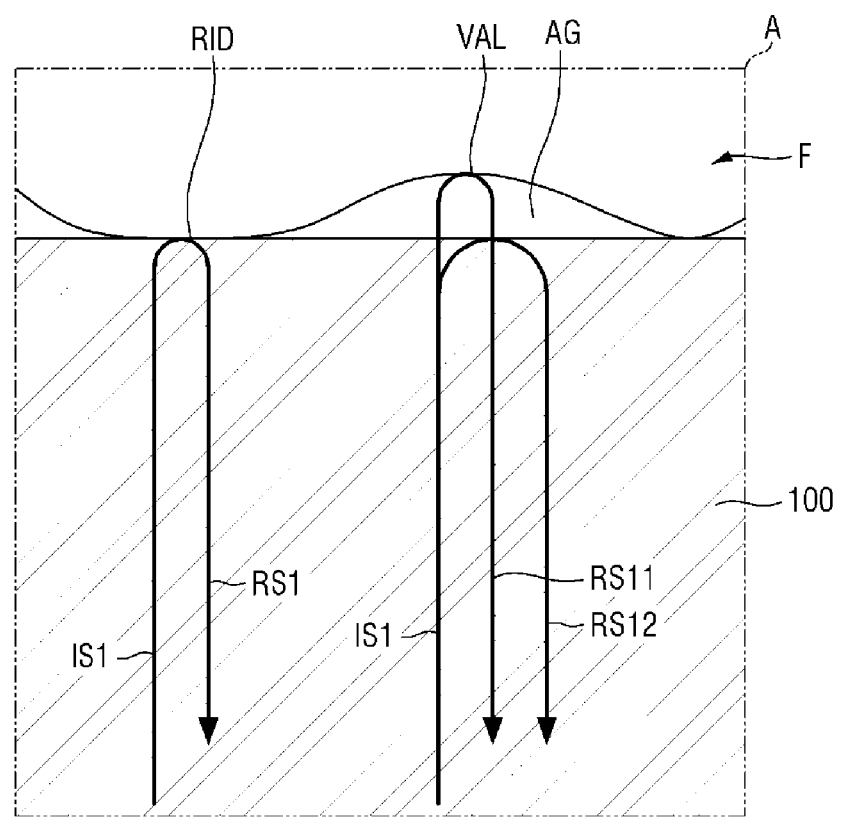
FIG. 7 is an enlarged cross-sectional view of area A of FIG. 5.

FIG. 7 is an enlarged cross-sectional view of area A of FIG. 5.

Referring to FIGS. 5 and 7, a first ultrasonic wave IS1 is irradiated to the ridge RID and the valley VAL of the fingerprint and then reflected by the ridge RID and the valley VAL. The first ultrasonic wave IS1 irradiated toward the ridge RID may pass through the fifth bonding member AM5, the second metal plate LP2, the fourth bonding member AM4, the protective layer PF, the third bonding member AM3, the display panel 300, the first bonding member AM1, the polarization layer POL, the second bonding member AM2, and the cover window 100 to reach the ridge RID. As shown in FIG. 7, because the ridge RID is in direct contact with the cover window 100, there may be no gap, e.g., air gap AG, between the ridge RID and the cover window 100. On the other hand, the first ultrasonic wave IS1 irradiated toward the valley VAL may pass through the fifth bonding member AM5, the second metal plate LP2, the fourth bonding member AM4, the protective layer PF, the third bonding member AM3, the display panel 300, the first bonding member AM1, the polarization layer POL, the second bonding member AM2, the cover window 100, and the air gap AG to reach the valley VAL. In the case of the first ultrasonic wave IS1 irradiated toward the valley VAL, it may further pass through the air gap AG as compared to the first ultrasonic wave IS1 irradiated toward the ridge RID. With regard to the first ultrasonic wave IS1 emitted by the ultrasonic fingerprint sensor 400, the first ultrasonic wave IS1 irradiated to the ridge RID and reflected by the ridge RID may be converted into a first signal RS1. Further, the first ultrasonic wave IS1 irradiated to the valley VAL and reflected by an interface between the air gap AG and the cover window 100 may be converted into a first reflection signal RS11, and the first ultrasonic wave IS1 irradiated to the valley VAL and reflected by the valley VAL may be converted into a second reflection signal RS12, the first and second reflection signals RS11 and RS12 constituting the first signal RS1. The magnitude of the first reflection signal RS11 may be greater than that of the second reflection signal RS12.

The fingerprint sensor 400 may recognize the ridge RID and the valley VAL based on a first time difference between an emission time point of the first ultrasonic wave IS1 and an arrival time point of the first signal RS1 reflected by the ridge RID and a second time difference between the emission time point of the first ultrasonic wave IS1 and an arrival time point of the first signal RS1 reflected by the valley VAL and the interface between the air gap AG and the cover window 100. However, given the existence of the air gap AG between the valley VAL and the cover window 100 and the ultrasonic wave propagation speed varying with medium, it may not be easy to distinguish between the ridge RID and the valley VAL.

In order to factor in the air gap AG between the valley VAL and the cover window 100 for more accurate distinction between the ridge RID and the valley VAL, it may be considered to calculate a ratio between the strength of the first ultrasonic wave IS1 and the strength of the first signal RS1 as a method of distinguishing between the ridge RID and the valley VAL. The ratio of the strength of the first signal RS1 to the strength of the first ultrasonic wave IS1 is defined as a reflection coefficient R (i.e., R=the strength of the first signal RS1/the strength of the first ultrasonic wave IS1). In detail, the reflection coefficient of the first ultrasonic wave IS1 irradiated to the valley VAL may be greater than the reflection coefficient of the first ultrasonic wave IS1 irradiated to the ridge RID. In other words, whether it is the ridge RID or the valley VAL may be determined based on the reflection coefficient of the first ultrasonic wave IS1.

Referring back to FIG. 5, if the metal plate LP is disposed on the path of the first ultrasonic wave IS1 irradiated upward from the fingerprint sensor 400 and/or the first signal RS1 reflected from the fingerprint of the finger F, the signal strength of each of the first ultrasonic waves IS1 and the signal strength of the first signal RS1 may be reduced. Accordingly, in the display device according to one embodiment, the metal plate LP is partially recessed in the path of the first ultrasonic wave IS1 irradiated upward from the fingerprint sensor 400 and/or the first signal RS1 reflected from the fingerprint of the finger F.

Figure 8:
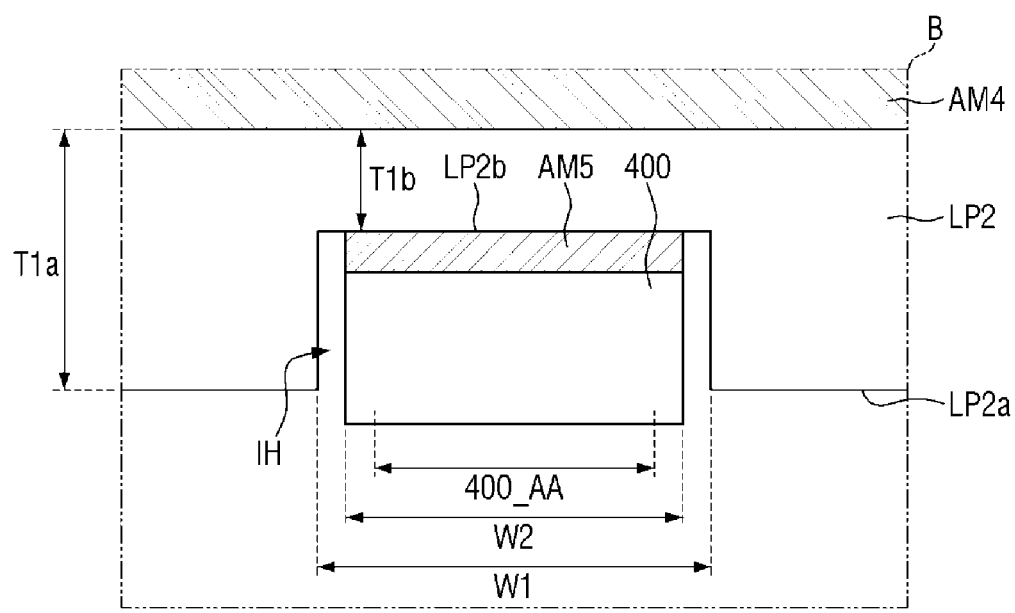
FIG. 8 is an enlarged cross-sectional view of area B of FIG. 5.

FIG. 8 is an enlarged cross-sectional view of area B of FIG. 5.

Referring to FIGS. 5 and 8, the second metal plate LP2 includes the indentation groove IH recessed in a direction from the other surface LP2a of the second metal plate LP2 to one surface (the surface facing the fourth bonding member AM4), and a thickness T1b of the second metal plate LP2 in which the indentation groove IH is formed may be 30% to 40% of the thickness T1a of the second metal plate LP2 in which the indentation groove IH is not formed. According to one embodiment, without disposing the fingerprint sensor 400 in the through hole completely penetrating the second metal plate LP2, the indentation groove IH is formed such that the second metal plate LP2 is partially recessed, and the fingerprint sensor 400 is disposed in the corresponding indentation groove IH. Thus, there is an advantage in that it is possible to minimize a defective phenomenon in which the region of the second metal plate LP2 to which the fingerprint sensor 400 is attached is visually recognized from the outside while minimizing a phenomenon in which the display panel 300 is pressed in the fingerprint sensor 400 attachment process.

A width W2 of the fingerprint sensor 400 may be smaller than a width W1 of the indentation groove IH.

The fingerprint sensor 400 includes an active area 400_AA for transmitting the first ultrasonic wave IS1 and receiving the first signal RS1. The periphery of the active area 400_AA may be defined as an inactive area. As shown in FIG. 8, the active area 400_AA may overlap the indentation groove IH in the thickness direction.

The indentation groove IH of the second metal plate LP2 of the display device 10 according to one embodiment may be formed through an etching process.

Hereinafter, other embodiments will be described.

Figure 9:
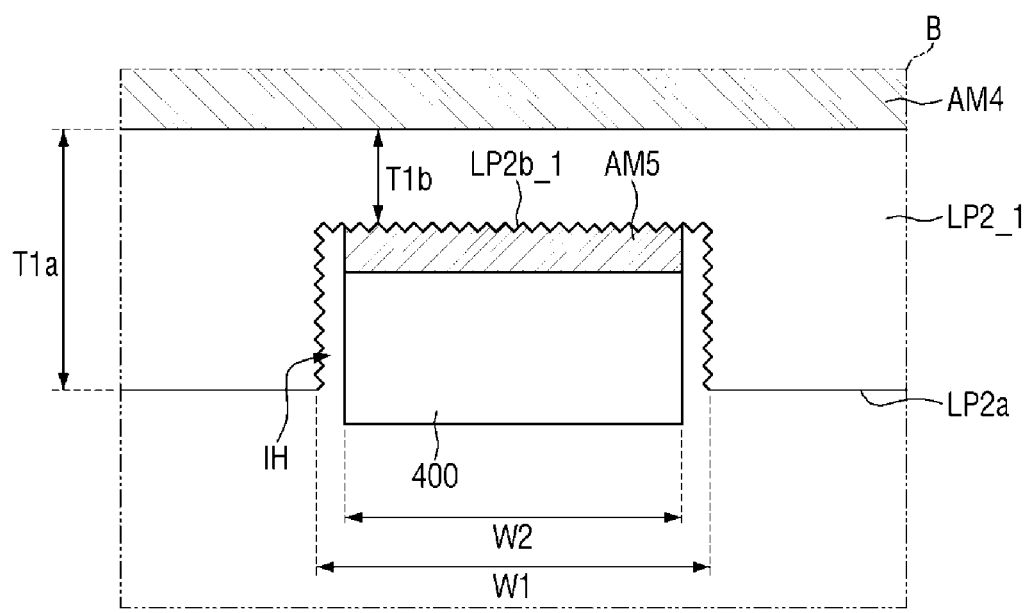
FIG. 9 is an enlarged cross-sectional of area B of FIG. 5 according to another embodiment.

FIG. 9 is an enlarged cross-sectional of area B of FIG. 5 according to another embodiment.

Referring to FIG. 9, a display device according to the present embodiment is different from the display device of FIG. 8 in that the indentation groove IH of a second metal plate LP2_1 is formed through an etching process, and surface roughness is generated on the other surface (or bottom surface) of the second metal plate LP2_1 on which the indentation groove IH is formed.

For example, the indentation groove IH is formed through a wet etching process. In this case, the surface roughness may be generated on the other surface (or the bottom surface) on which the indentation groove IH of the second metal plate LP2_1 is formed. For this reason, as shown in FIG. 9, the roughness of the other surface LP2$b$_1 of the second metal plate LP2_1 on which the indentation groove IH is formed may be greater than that of the other surface LP2$a$ of the second metal plate LP2_1 on which the indentation groove IH is not formed. That is, the roughness between the other surface LP2$b$_1 of the second metal plate LP2_1 and the other surface LP2$a$ of the second metal plate LP2_1 is substantially different from each other.

Figure 10:
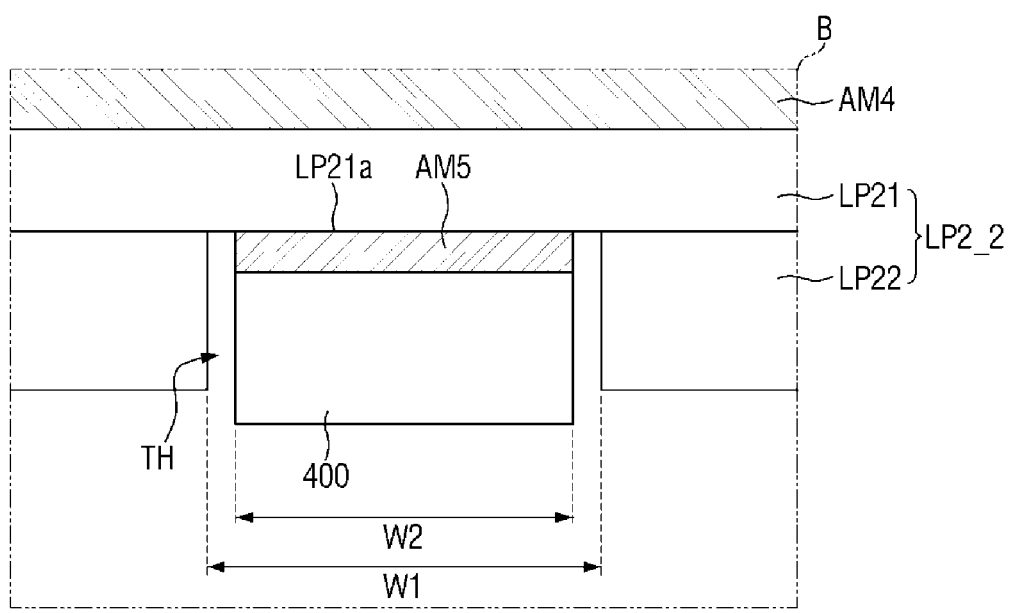
FIG. 10 is an enlarged cross-sectional of area B of FIG. 5 according to still another embodiment.

FIG. 10 an enlarged cross-sectional of area B of FIG. 5 according to still another embodiment.

Referring to FIG. 10, a display device according to the present embodiment is different from the display device of FIG. 8 in that a second metal plate LP2_2 includes a first metal plate part LP21 on a lower portion of the display panel 300 and a second metal plate part LP22 on a lower portion of the first metal plate part LP21, and a through hole TH exposing one surface LP21$a$ of the first metal plate part LP21 is formed in the second metal plate part LP22.

The fingerprint sensor 400 may be disposed on the one surface LP21$a$ of the first metal plate part LP21 in the through hole TH. A width W1 of the through hole TH may be greater than a width W2 of the fingerprint sensor 400.

For example, the thickness of the first metal plate part LP21 in the thickness direction DR3 may be the same as the thickness T1$b$ of the region of the second metal plate LP2 in which the indentation groove IH of FIG. 8 is formed, and the thickness of the second metal plate part LP22 in the thickness direction DR3 may be the same as a value obtained by subtracting the thickness T1$b$ of the region of the second metal plate LP2 in which the indentation groove IH is formed from the thickness T1$a$ of the region of the second metal plate LP2 in which the indentation groove IH of FIG. 8 is not formed. However, the present disclosure is not limited thereto.

Figure 11:
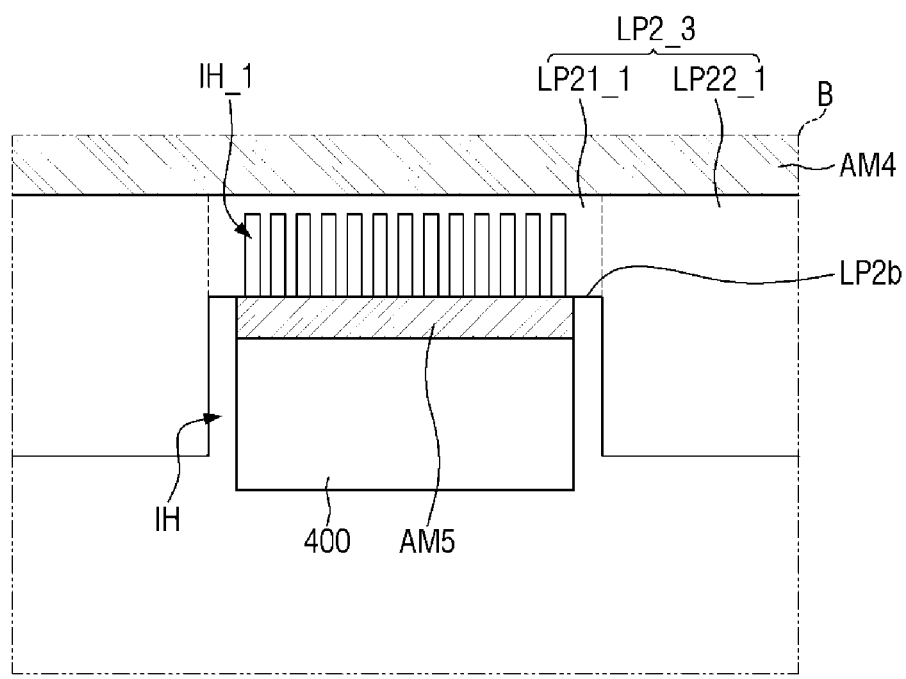
FIG. 11 is an enlarged cross-sectional of area B of FIG. 5 according to still another embodiment.

FIG. 11 is an enlarged cross-sectional of area B of FIG. 5 according to still another embodiment.

Referring to FIG. 11, a display device according to the present embodiment is different from the display device of FIG. 8 in that a second metal plate LP2_3 includes a first metal plate part LP21_1 overlapping the indentation groove IH, and a second metal plate part LP22_1 not overlapping the indentation groove IH, and it further includes a plurality of first indentation grooves IH_1 recessed from the other surface LP2$b$ of the first metal plate part LP21_1 extending toward one surface (the surface facing the display panel 300) of the first metal plate part LP21_1 in the thickness direction DR3.

The plurality of first indentation grooves IH_1 may overlap the indentation groove IH in the thickness direction. The fingerprint sensor 400 may be disposed in the indentation groove IH and overlap the plurality of first indentation grooves IH_1.

Although not shown, the fifth bonding member AM5 may be partially filled in the plurality of first indentation grooves IH_1, but is not limited thereto.

Figure 12:
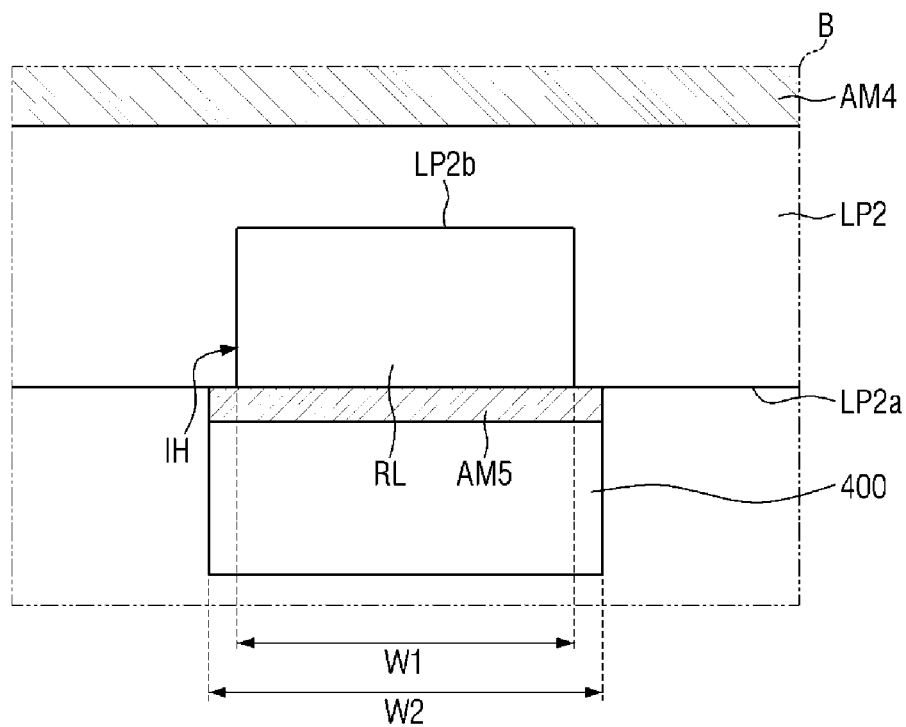
FIG. 12 is an enlarged cross-sectional of area B of FIG. 5 according to still another embodiment.

FIG. 12 is an enlarged cross-sectional of area B of FIG. 5 according to still another embodiment.

Referring to FIGS. 7, 8, 9, 10, 11, and 12, a display device according to the present embodiment is different from the display device of FIG. 8 in that the width W2 of the fingerprint sensor 400 is greater than the width W1 of the indentation groove IH, and a filling member RL is further disposed between the fifth bonding member AM5 and the second metal plate LP2.

More specifically, the width of the fifth bonding member AM5 disposed between the fingerprint sensor 400 and the filling member RL may also be greater than the width W1 of the indentation groove IH.

When the fingerprint sensor 400 is disposed on the other surface of the second metal plate LP2 (see FIG. 9) on which the indentation groove IH having the surface roughness is formed, distortion of the first ultrasonic wave IS1 and the first signal RS1 of the fingerprint sensor 400 may occur. However, in the case of the display device according to the present embodiment, by placing the filling member RL between the indentation groove IH and the fingerprint sensor 400, distortion of the first ultrasonic wave IS1 and the first signal RS1 irradiated and reflected from the fingerprint sensor 400 may be corrected by the filling member RL.

Furthermore, although not shown, the fingerprint sensor 400 is not substantially arranged to be flat in the same manner as the metal plate LP in FIG. 5, and is inclined at a predetermined angle with the extension direction (horizontal direction) of the second metal plate LP2. In the process of attaching the fingerprint sensor 400 to the second metal plate LP2 through the fifth bonding member AM5, the fingerprint sensor 400 inclined at a predetermined angle is disposed to extend in the same direction as the extension direction (or horizontal direction) of the second metal plate LP2. However, in the process of arranging the inclined fingerprint sensor 400 to be flat, a predetermined stress may occur. When the stress is directly transferred to the second metal plate LP2 to which the fingerprint sensor 400 is attached, the corresponding region of the second metal plate LP2 to which the fingerprint sensor 400 is attached may be bent by the applied stress. However, in the present embodiment, the filling member RL between the second metal plate LP2 and the fingerprint sensor 400 may relieve the stress. The stress relaxation characteristic of the filling member RL may be achieved by adjusting the modulus of the filling member RL. The modulus of the filling member RL tends to be proportional to the hardness of the filling member RL, and the hardness of the filling member RL may be about 10 times or more the hardness of the fifth bonding member AM5. More preferably, the hardness of the filling member RL may be 20 times or 30 times or more the hardness of the fifth bonding member AM5. For example, the hardness of the filling member RL may be 0.8 Gps or more, but is not limited thereto.

Also, in the display device according to the present embodiment, the inside of the indentation groove IH is filled using the filling member RL having a hardness much greater than that of the fifth bonding member AM5, and the fingerprint sensor 400 is attached to the bottom surface of the filling member RL through the fifth bonding member AM5, thereby preventing defective pressing of the protective layer PF and/or the display panel 300, and visual recognition of the indentation groove IH.

The filling member RL may include materials well known in the art capable of filling the indentation groove IH. For example, the filling member RL may include a material that can be filled in the indentation groove IH by an injection method or an adhesion method. According to one embodiment, the filling member RL is formed in the indentation groove IH through an injection method.

The filling member RL may be made of acrylonitrile butadiene styrene copolymer (ABS), polycarbonate (PC), or the like, although not limited thereto. The hardness of the filling member RL may be smaller than that of the adjacent second metal plate LP2. Furthermore, the filling member RL is located on the path of the first ultrasonic wave IS1 irradiated from the fingerprint sensor 400 and the first ultrasonic wave IS1 is generally set to a frequency band which allows the ultrasonic wave to easily pass through the display panel 300. Therefore, in order to increase the sensing efficiency of the fingerprint sensor 400, the filling member RL preferably has an impedance similar to that of the display panel 300. For example, the impedance of the filling member RL may be set within an error of about 5 MPa*m/s*$10^{-6}$ of the impedance of the display panel 300.

In some other embodiments, when the ultrasonic fingerprint sensor is applied, the filling member RL may further include a black colorant. Since the filling member RL further includes a black colorant, it is possible to prevent the fingerprint sensor 400 from being visually recognized from the outside.

When the optical fingerprint sensor is applied as the fingerprint sensor 400, the filling member RL may have the same hardness and material as the filling member RL when the ultrasonic fingerprint sensor is applied. However, since the optical fingerprint sensor recognizes a fingerprint through light, the filling member RL may be designed in consideration of the transmittance of the corresponding light. When the optical fingerprint sensor is applied, the filling member RL may have a transmittance of about 90% or more for the light. The light may include visible light, ultraviolet light, or infrared light.

Since other descriptions have been made with reference to FIG. 8, repeated descriptions are omitted.

Figure 13:
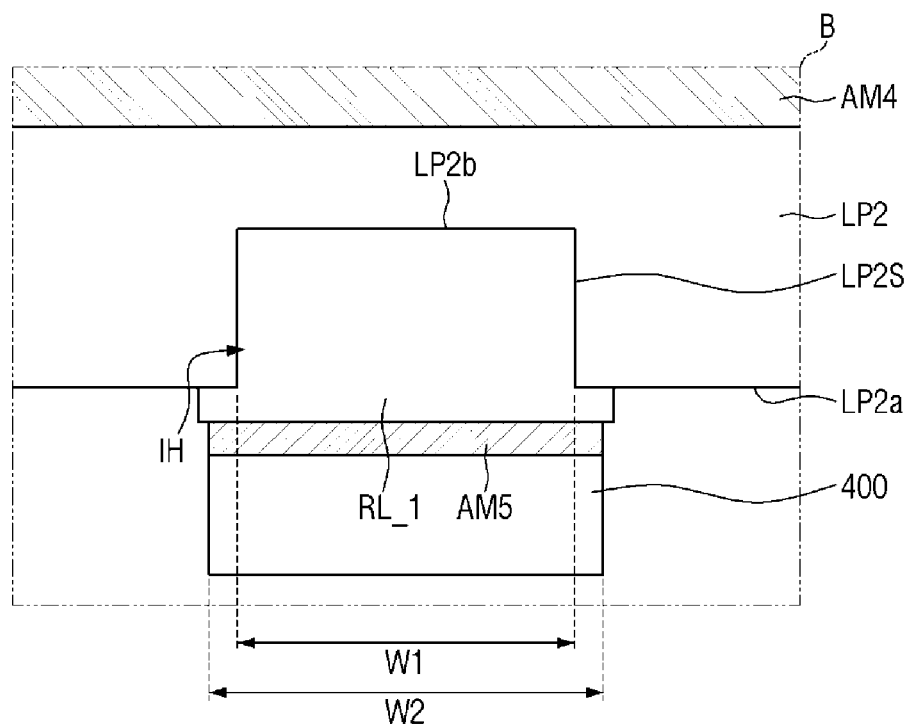
FIG. 13 is an enlarged cross-sectional of area B of FIG. 5 according to still another embodiment.

FIG. 13 is an enlarged cross-sectional of area B of FIG. 5 according to still another embodiment.

Referring to FIG. 13, a display device according to the present embodiment is different from the display device of FIG. 11 in that a filling member RL_1 overlaps the other surface LP2*a* of the second metal plate LP2 on which the indentation groove IH is not formed.

More specifically, in cross-sectional view, the bottom surface of the filling member RL_1 may be positioned lower than the other surface LP2*a* of the second metal plate LP2 on which the indentation groove IH is not formed (protrude downward). The width of the portion positioned lower than the other surface LP2*a* of the second metal plate LP2 on which the indentation groove IH of the filling member RL_1 is not formed may be equal to, greater than, or smaller than the width W1 of the fingerprint sensor 400, but may be greater than the width W1 of the filling member RL_1 filled in the indentation groove IH.

Since other descriptions have been made with reference to FIG. 8, repeated descriptions are omitted.

Although embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A display device comprising:
   a display panel;
   a metal plate disposed on a bottom surface of the display panel, the metal plate including a first surface facing the bottom surface of the display panel and a second surface opposite to the first surface; and
   a fingerprint sensor overlappingly disposed on the second surface of the metal plate,
   wherein the metal plate includes an indentation groove recessed in a direction toward the first surface from the second surface of the metal plate, and
   the fingerprint sensor is disposed on the second surface of the metal plate on which the indentation groove is formed, and
   wherein a filling member is disposed in the indentation groove of the metal plate.

2. The display device of claim 1, wherein a thickness of the metal plate in which the indentation groove is formed is smaller than a thickness of the metal plate in which the indentation groove is not formed.

3. The display device of claim 2, wherein the thickness of the metal plate in which the indentation groove is formed is about 30% to 40% of the thickness of the metal plate in which the indentation groove is not formed.

4. The display device of claim 2, further comprising a member-sensor bonding member disposed between the fingerprint sensor and the second surface of the metal plate on which the indentation groove is formed.

5. The display device of claim 4, wherein a width of the fingerprint sensor is smaller than a width of the indentation groove.

6. The display device of claim 4, wherein the metal plate and the filling member include different materials.

7. The display device of claim 6, wherein the filling member includes acrylonitrile butadiene styrene copolymer (ABS), or polycarbonate (PC).

8. The display device of claim 4, wherein a hardness of the filling member is greater than a hardness of the member-sensor bonding member.

9. The display device of claim 8, wherein the hardness of the filling member is at least 10 20 times greater than the hardness of the member-sensor bonding member.

10. The display device of claim 9, wherein the hardness of the filling member is 0.8 Gps or more.

11. The display device of claim 4, wherein the fingerprint sensor includes an optical fingerprint sensor, and the filling member has a transmittance of 90% or more for light.

12. The display device of claim 1, wherein a roughness of the second surface of the metal plate on which the indentation groove is formed is greater than a roughness of the second surface of the metal plate on which the indentation groove is not formed.

13. The display device of claim 12, wherein the indentation groove of the metal plate is formed through an etching process.

14. The display device of claim 1, wherein the fingerprint sensor includes an ultrasonic fingerprint sensor, and the ultrasonic fingerprint sensor performs fingerprint recognition by comparing an incident ultrasonic wave incident upward from the ultrasonic fingerprint sensor with a fingerprint reflected ultrasonic wave reflected from a fingerprint.

15. The display device of claim 1, further comprising:
   a bonding member between the fingerprint sensor and the filling member,
   wherein a hardness of the filling member is greater than a hardness of the bonding member.

16. The display device of claim 1, wherein an impedance of the filling member is set within an error of about 5 MPa*m/s*$10^{-6}$ of an impedance of the display panel.

* * * * *